United States Patent
Pracklein et al.

(10) Patent No.: US 7,870,811 B2
(45) Date of Patent: Jan. 18, 2011

(54) THERMAL STRIPPING APPARATUS

(75) Inventors: Doris Pracklein, Unterhaching (DE); Thomas Detemple, Munich (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/500,147

(22) Filed: Jul. 9, 2009

(65) Prior Publication Data
US 2010/0000373 A1  Jan. 7, 2010

Related U.S. Application Data (63) Continuation of application No. PCT/EP2008/050241, filed on Jan. 10, 2008.

(30) Foreign Application Priority Data

Jan. 11, 2007  (DE) ........................ 10 2007 001 707

(51) Int. Cl.
*H02G 1/12* (2006.01)
*H05B 1/00* (2006.01)

(52) U.S. Cl. ........................... 81/9.4; 219/229; 219/241
(58) Field of Classification Search .......... 81/9.4–9.44; 30/90.4, 90.6, 90.8; 219/229, 241
See application file for complete search history.

(56) References Cited

U.S. PATENT DOCUMENTS

| | | | |
|---|---|---|---|
| 3,707,099 A | 12/1972 | Petz | 81/9.5 A |
| 3,880,022 A * | 4/1975 | Miller | 81/9.4 |
| 5,016,500 A * | 5/1991 | Conrad et al. | 81/9.4 |
| 5,862,593 A * | 1/1999 | Huang | 30/92 |
| 6,321,621 B1 * | 11/2001 | Stepan | 81/9.51 |
| 7,360,472 B2 * | 4/2008 | Krampe et al. | 81/9.4 |
| 2004/0055161 A1 * | 3/2004 | Chiang et al. | 30/90.4 |

FOREIGN PATENT DOCUMENTS

| | | |
|---|---|---|
| DE | 4203995 A1 | 8/1993 |
| EP | 0710858 A1 | 5/1996 |
| EP | 0899594 A2 | 3/1999 |
| WO | WO98/33082 | 7/1998 |
| WO | WO2004/008186 A2 | 1/2004 |
| WO | WO2006/112675 A1 | 10/2006 |

OTHER PUBLICATIONS

Corning Cable Systems LLC, S218R/S219D/S219L Thermal Stripper Product Sheet, 1 page.

(Continued)

*Primary Examiner*—Hadi Shakeri (57) ABSTRACT

In order to improve the stripping process, a thermal stripping apparatus is proposed which has a thermal stripper with a first holder section and a second holder section. The holder sections are designed to accommodate and hold at least one coating glass fiber, wherein the first holder section is arranged such that it can move with respect to the second holder section along an accommodated glass fiber. A housing is also provided, having a handle section and an appliance section, in which the thermal stripper is accommodated. A drive unit, which has a lever, is operatively connected to the thermal holder section of the thermal stripper such that a movement with respect to the handle section is converted to a movement of the first holder section.

12 Claims, 7 Drawing Sheets

OTHER PUBLICATIONS

Furukawa America, "Fitel Splicers," Product Catalogue, vol. 4, 2006, 28 pages.

Ilsintech, "Window Stripper with Hi-Strength Fiber," Product Sheet, www.ilsintech.com/featured.htm#c, 3 pages.

Schleuniger, Product Sheet, www.schleuniger.com/de/desktopdefault.aspx/tabid-68/, 2 pages.

* cited by examiner

FIG 7

THERMAL STRIPPING APPARATUS

RELATED APPLICATIONS

This application is a continuation of International Application No. PCT/EP2008/050241 filed Jan. 10, 2008, which claims priority to German Application No. 102007001707.5 filed Jan. 11, 2007, both applications being incorporated herein by reference.

FIELD

The invention relates to a thermal stripping apparatus, in particular for optical waveguides.

TECHNICAL BACKGROUND

So-called stripping tools or strippers are used to remove a coating from optical waveguides. In this case, in addition to purely mechanical strippers, strippers which operate with heating, so-called "thermal strippers", are also used. These tools often have a rectangular design and comprise two holding elements which can move with respect to one another. The glass fiber cables are inserted in the two holders, are fixed, and the coating of the fibers is heated. The coating is finally drawn off by a lateral movement of the two holders apart from one another. The lateral movement takes place along a slide rail, and is carried out by a user.

A flat surface, on which the stripping tool is placed, may be necessary for uniform and fault-free removal of a coating. The removal of the coating, which is referred to as "stripping", takes place by means of a movement, which is carried out by hand, of the two holders away from one another. Depending on the design of the stripper, the force to be applied can be controlled by the user only with difficulty, and this can lead to difficulties in monitoring the movement process. It is therefore desirable to provide a stripper which allows a controlled stripping movement to be carried out.

SUMMARY

Disclosed is a thermal stripping apparatus for stripping coatings of glass fibers that includes a thermal stripper with a first holder section and a second holder section. The holder sections are designed to accommodate and to hold at least one coated glass fiber. In this case, the first holder section is arranged such that it can move with respect to the second holder section along the accommodated glass fiber, in order to strip a coating off the glass fiber. Furthermore, a housing is provided, having a handle section for convenient gripping, and an appliance section. The thermal stripper is arranged in the handle section. In order to improve the monitoring of a stripping process, the appliance arrangement comprises a drive unit which has a lever. The drive unit is in this case operatively connected to the first holder section of the thermal stripper such that a movement of the lever with respect to the handle section is converted to a movement of the first holder section.

The first holder section is moved by a controlled movement of the lever with respect to the handle section. Since there is a well-defined relationship between the lever and the handle section, it is particularly simple for a user to apply a controlled pressure, a tension or some other force to the lever. This leads to a likewise controlled stripping movement of the first holder section. In this case, the handle section is designed to be gripped by one hand. The apparatus can thus be gripped with one hand, and the stripping movement can likewise be carried out with one hand. In one refinement, the stripping apparatus, in particular the handle section and the lever, is arranged and designed with respect to one another such that a stripping movement is carried out by closing one hand. In this case, the apparatus is gripped with one hand, and the fingers surround the lever. The stripping movement is carried out by closing the hand, since this is converted by the lever and the drive unit to a movement. Thus, one hand remains free and, at the same time, the stripping movement is carried out in a controlled manner.

In one embodiment, a semicircular or paraboloid movement of the lever in the direction of the handle section of the housing is converted to a lateral movement of the first holder section. In another refinement of the invention, the drive unit is designed to convert an at least partially rotary movement of the lever to a lateral movement of the first holder section.

For this purpose, the first holder section can be coupled to a guide rod which forms a part of the drive unit. For instance, the lever of the drive unit has a toothed rod which is operatively connected to a gearwheel, as a result of which the guide rod is caused to carry out a lateral movement on the basis of a rotary movement of the lever, via the gearwheel.

In other embodiments, the drive unit has a spring which is stressed during a movement of the first holder section. The first holder section is therefore moved back to an original position after completion of a lever movement due to the spring.

In a further embodiment, an electric motor is provided, forms a part of the drive unit, and can be controlled by the lever. The electric motor, which can be operated by means of batteries or rechargeable batteries which are used to operate a heater for the thermal stripper, is coupled to the first holder section for production of the lateral movement of the first holder section.

In another embodiment, the housing of the thermal stripping apparatus has a profile in the form of a pistol. For example, a battery or a rechargeable battery element can be accommodated in the handle section of the housing. The battery element or rechargeable battery element is used to supply electrical power to the thermal stripper. The stripper itself is arranged in an area of the "pistol barrel" of the housing. In another embodiment, a cylindrical housing may be provided with the appliance section and the handle section. Switches, potentiometers or other elements for adjustment of the heating can be arranged in the appliance, for precise heating of the thermal stripper.

In another embodiment, the housing is designed with removable covers in the appliance section, which are arranged above the holder section of the stripper. This allows easy access, as a result of which glass fibers to be stripped can easily be fixed.

BRIEF DESCRIPTION OF THE FIGS

The invention will be explained in detail in the following text with reference to exemplary embodiments. In the Fig.s.

DETAILED DESCRIPTION

Further aspects and embodiments of the present invention are summarized in the following description. In addition, reference is made to the accompanying Fig.s, which form a part of the description and in which illustrations are used to show how the invention can be implemented in practice. The embodiments in the drawings represent a summary, in order to allow better understanding of one or more aspects of the present invention. This summary is not a comprehensive overview of the invention and also does not have the intention of restricting the features or key elements of the invention to one specific embodiment. It should be understood that other embodiments could be used and that structural or logical changes can be made without departing from the essence of the present application. The elements in the drawings are not necessarily true to scale with respect to one another. Components which have the same effect or work in the same way have the same reference symbols.

Figure 1:
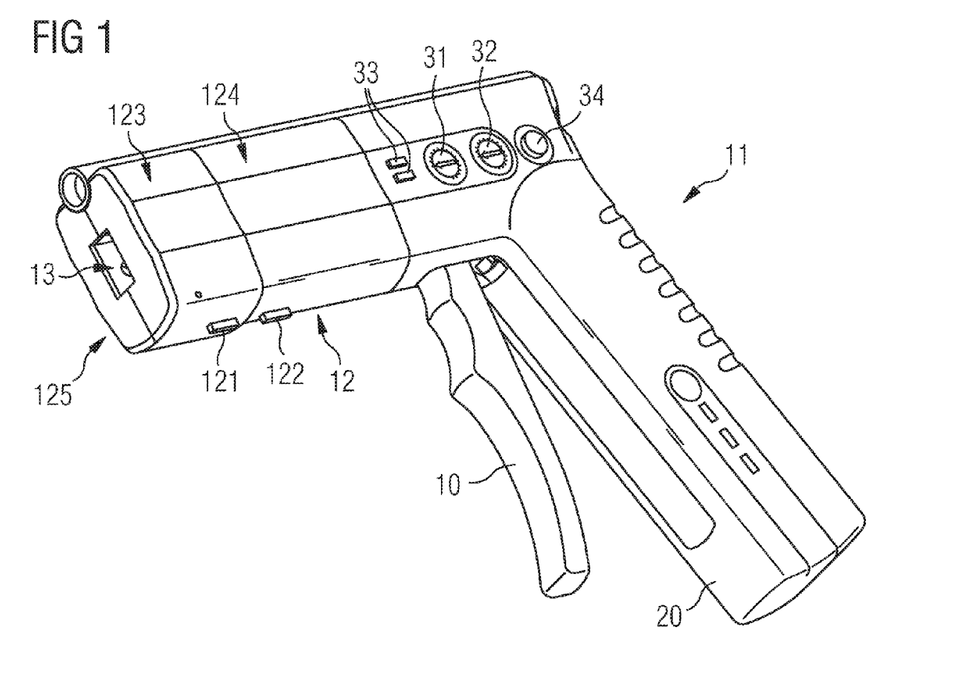
FIG. 1 shows one exemplary embodiment of the invention in the form of a pistol.

FIG. 1 shows one exemplary embodiment of the stripping apparatus, in the form of a pistol. This can easily be controlled by a user using one hand, and, by simple pressure on the lever with the gripping hand of the user, allows stripping and thus removal of the coating from a glass fiber which has been introduced into and fixed in the stripping apparatus. The illustrated embodiment can therefore be used not only in laboratory conditions but also during manufacture and assembly, as well as during repairs. In addition to the embodiment illustrated here with a housing in the form of a pistol, it is possible to use a housing in the form of a bar. The lever can then be in the form of a sliding apparatus.

The illustrated stripping device shown in FIG. 1 comprises the thermal stripper 12 with two holder sections, which are accommodated in the pistol barrel. The two holder sections are covered by folding elements 123 and 124 and thus protect the elements of the stripper 12. These are removable, such that the user can fix a glass fiber in the holder sections. In addition to a monitoring panel with light-emitting diodes 33, the "pistol barrel" contains two potentiometers 31 and 32 as well as an activation switch 34. The thermal stripper 12 is switched on and the heating for the coating is controlled via the potentiometers and the activation switch. The LEDs 33 indicate the operating state of the apparatus.

Furthermore, a handle section 11 is provided, in which a battery element 20 is arranged, in the form of a rechargeable battery. The rechargeable battery is used to provide the necessary power for the heating process of the thermal stripper 12. A lever 10 can be pulled by a movement toward the "pistol grip" 11. This movement is converted by a drive unit to a lateral movement of the "front" first holder section of the stripper 12. This therefore results in stripping of the holder sections and thus removal of the coating from a glass fiber.

The glass fiber to be stripped is inserted into the opening 13 on the front face of the pistol. The locking elements 121 and 122 on the lower face of the pistol stock are used to fix the inserted glass fibers in the two holder sections in order to allow cutting off with the aid of the separating insert.

Figure 2:
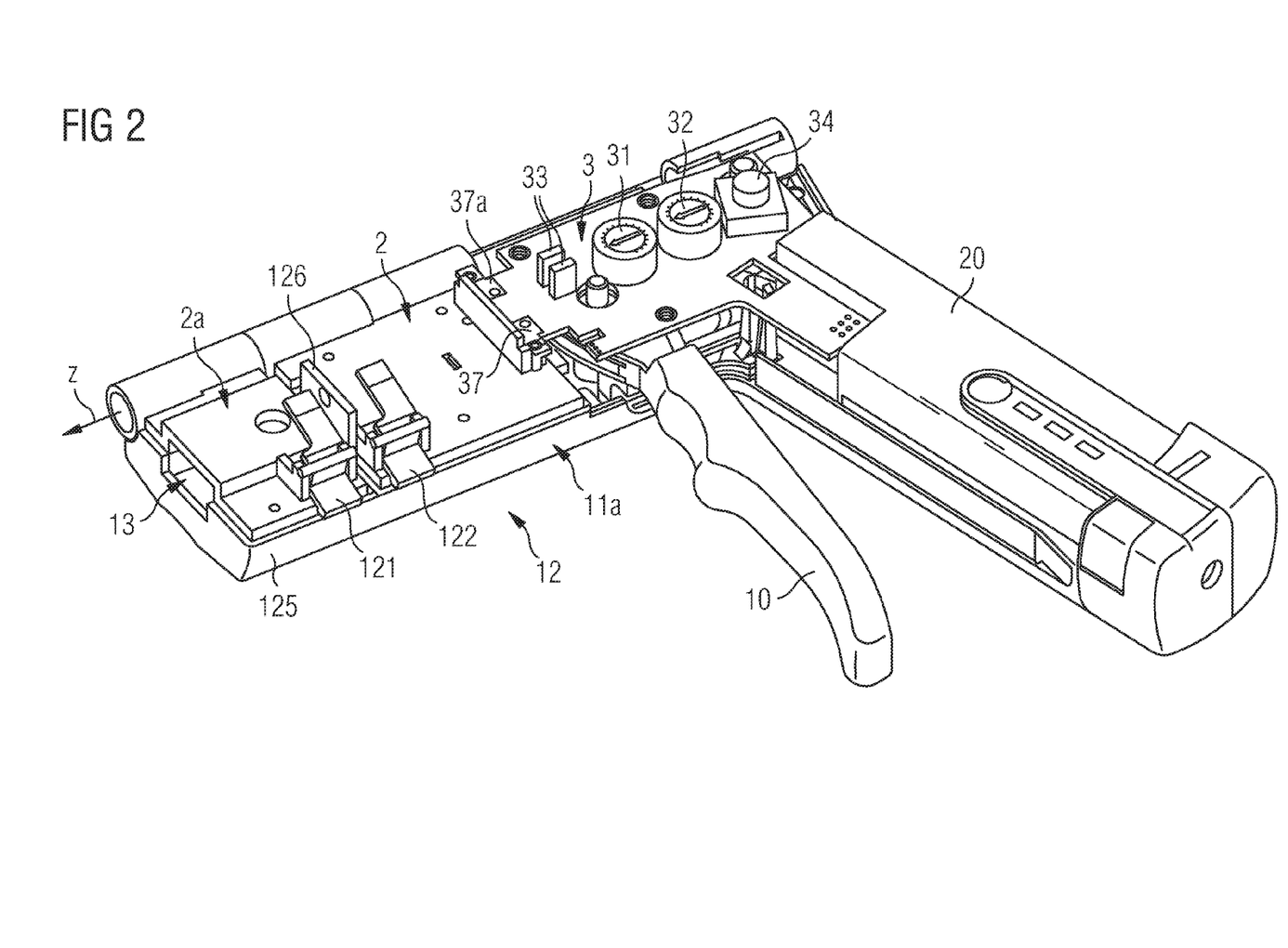
FIG. 2 shows the exemplary embodiment with a portion of the housing removed.

FIG. 2 shows the embodiment with one housing side removed, thus exposing the printed circuit board 3 as well as the stripper 12 with the two holder sections 2 and 2a. The drive unit, which is connected to the lever 10 and converts the movement of the lever 10 to a movement of the second holder section 2a in the z direction, is in this case arranged behind the printed circuit board 3, and is only partially visible in this case. The switching element 34, the potentiometers 31 and 32 and the LED 33 are accommodated on the printed circuit board 3. Furthermore, the printed circuit board has a connection to the rechargeable battery element 20 as well as contact elements 37, 37A for supplying current to the heating elements of the stripper. The current level and therefore the heating power of the first and second holder sections are adjusted by means of the potentiometers 31, 32.

The stripper 12 has a first holder section 2 which is rigidly fixed to the pistol barrel. A second holder section 2a, which can move with respect thereto, is arranged on a guide rail 4, which is not shown here, and a holding rail, and can move along the z direction. This movement is produced by the drive unit when the trigger lever 10 is operated.

Both holder sections 2 and 2a respectively contain locking elements 122 and 122, by means of which the coated glass fiber is fixed both in the first holder section and in the second holder section. A separating insert 126 is provided between the first and the second holder section. This is attached to the first holder section 2 and is used to cut off the coating of the glass fiber when the second holder section 2a is moved in the z direction.

Figure 3:
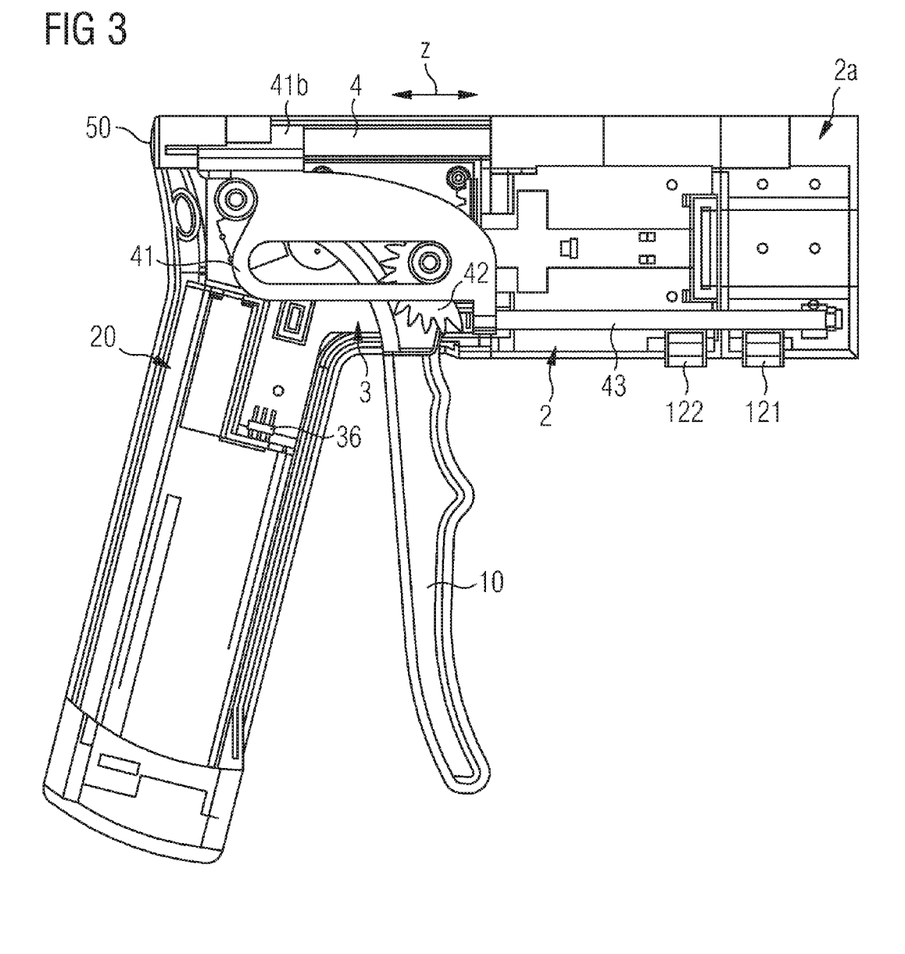
FIG. 3 shows the exemplary embodiment in a different view, with elements of the housing removed.

FIG. 3 shows a side view from the rear of the embodiment with the housing removed. This shows the connection 36 which connects the electrical elements of the printed circuit board to the rechargeable battery element 20. The printed circuit board 3 as well as the heating apparatuses for the stripper 12 are supplied with electrical power in this way. The second holder section 2a of the stripper is coupled to the guide rod 4, which is arranged in the upper area of the barrel. The guide rod 4 is moved along the z direction via the slide element 41. In consequence, the second holder section also carries out a lateral movement along the z direction.

The holding rail 43 is additionally provided in order to stabilize this lateral movement, and in the present case is firmly connected to the slide element 41 and to the second holder section 2a.

The slide element 41 has a cutout in which a cylindrical pin is arranged. This is firmly connected to an eccentric wheel 42. The eccentric wheel is operatively connected to the lever 10 and to the slide element 41, as a result of which the slide element 41 is moved in response to a trigger movement of the lever 10. The slide element 41 is connected to a slide 41a, which is arranged between the closure 50 and the guide rod 4. A movement of the slide element 41 also results in a movement of the guide rod 4, and therefore of the second holder section 2a of the thermal stripper, along the z direction.

Figure 4:
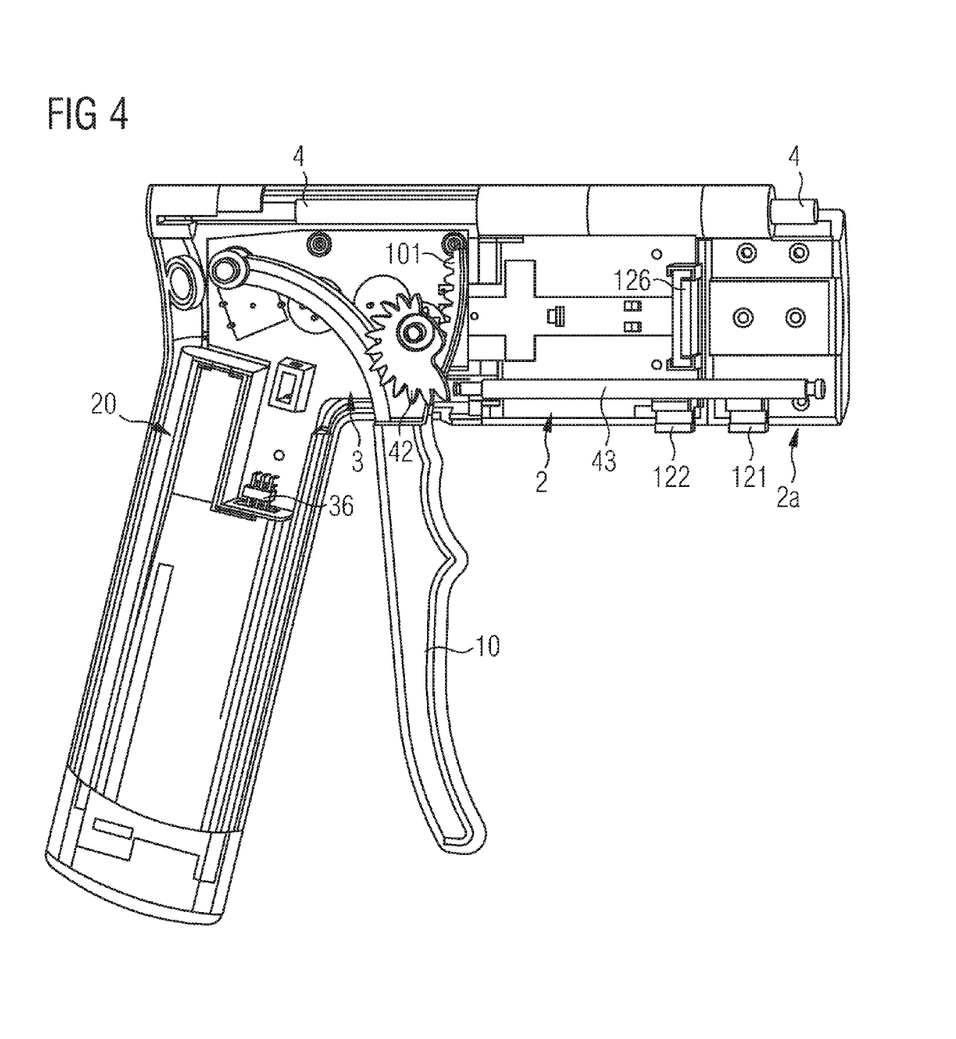
FIG. 4 shows a further view of the exemplary embodiment, in order to illustrate the principle of operation.

FIG. 4 shows the drive unit without the slide element 41 and 41a. As can be seen, the lever 10 comprises a toothed rod 101 which is arranged in a slightly curved shape. The eccentric wheel 42 is likewise rotated in response to a trigger movement of the lever 10, via a gearwheel which is located behind the eccentric wheel 42 and engages in the toothed rod 101. A further toothed rod is connected to the removed slide element 41, and engages in the gearwheels of the eccentric element 42. The sliding rod, and therefore the guide rod 4, are therefore moved along the z direction.

Figure 5:
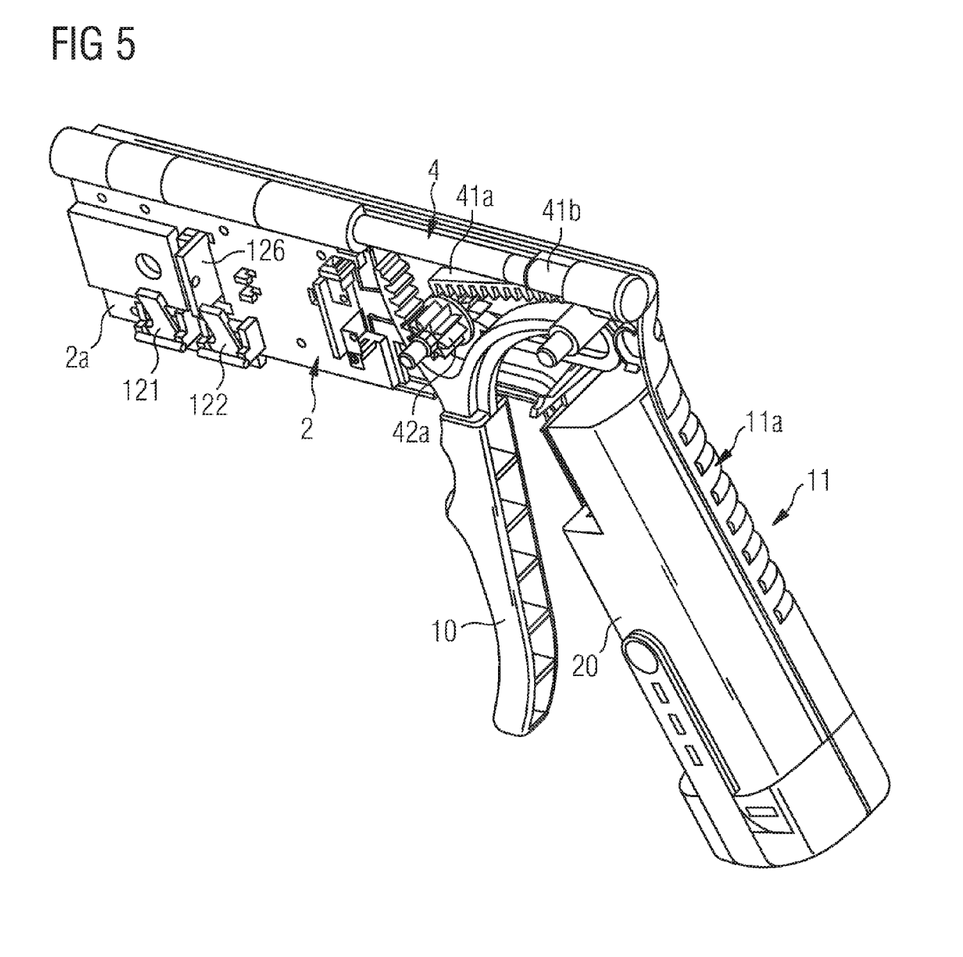
FIG. 5 shows a view of the exemplary embodiment, in order to illustrate the drive unit.

This method of operation of the drive unit is illustrated once again in FIG. 5, which shows the embodiment in a different perspective. The gearwheel 42a is operatively connected to the toothed rod 101 of the lever 10, and is coupled to the eccentric wheel 42 via the cylindrical pin. The gearwheels of the eccentric element 42 engage in the toothed rod 41a of the slide element 41. This is therefore moved together with the slide 41b along the z direction.

Figure 6:
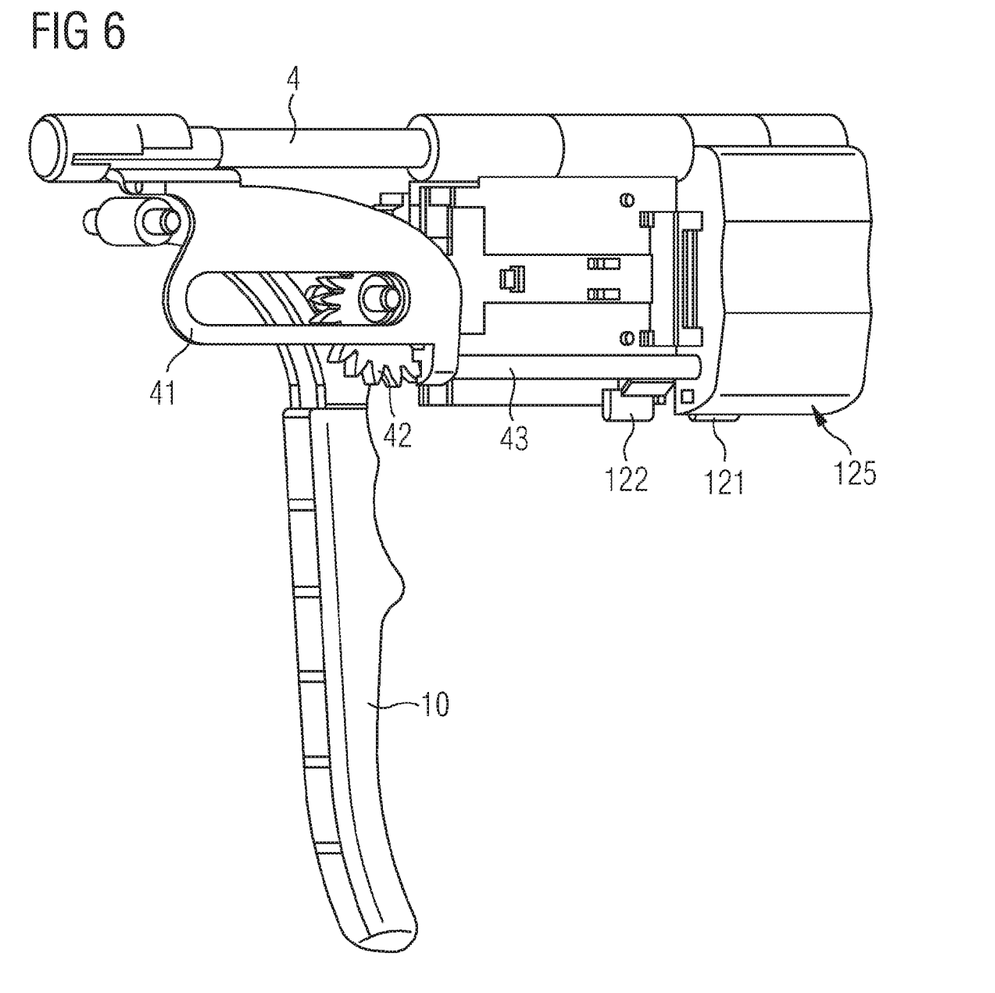
FIG. 6 shows a further view of the exemplary embodiment, with a thermal stripper and drive unit.
Figure 7:
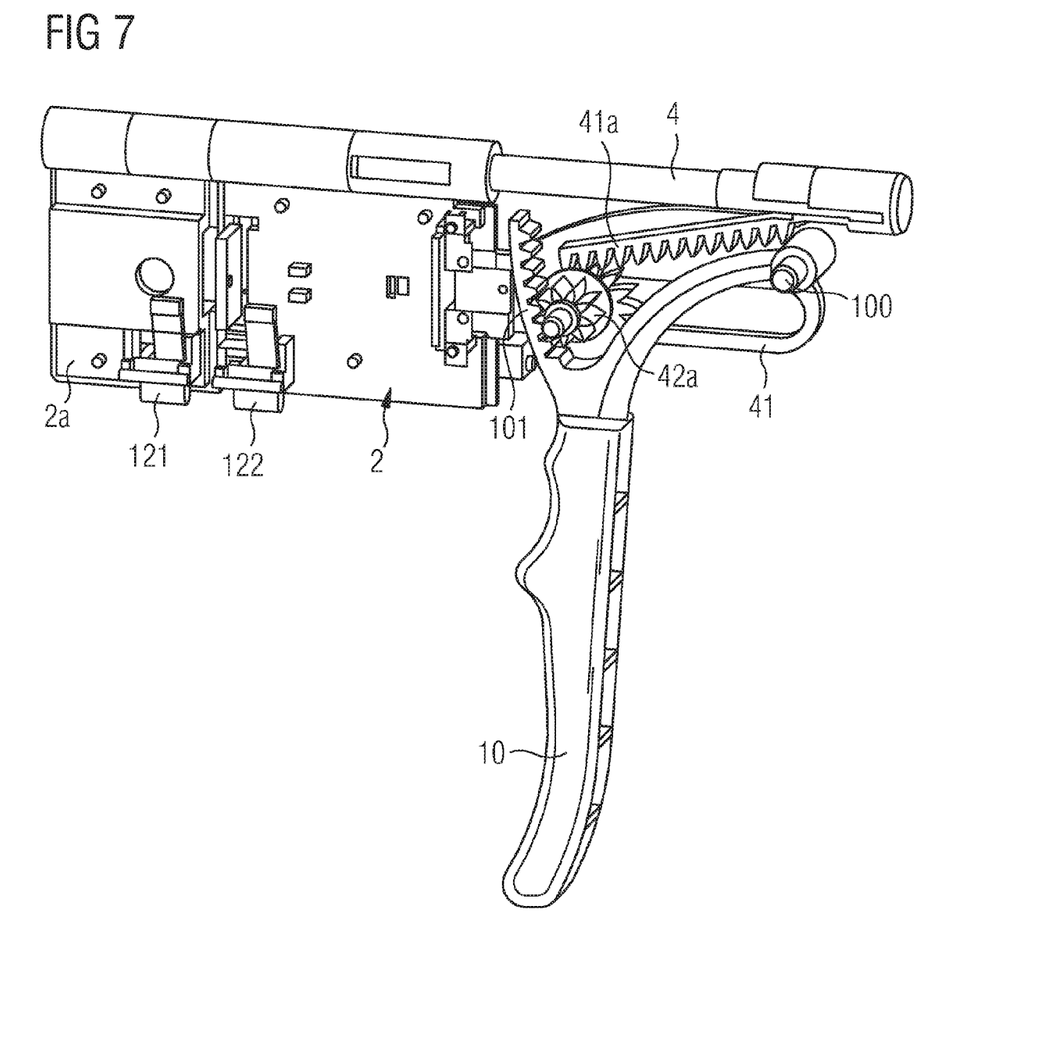
FIG. 7 shows a further view of the embodiment of FIG. 6.

FIGS. 6 and 7 show two views of the embodiment of the drive unit, as well as the thermal stripper of the embodiment. FIG. 6 clearly shows the guide rail 4 as well as the holding rail 43, which moves the second holder section 2a, which is covered by the cover 125. The guide rail 4 and rail 43 can also be referred to as slide rails. The cylindrical pin 100 of the lever 10 fastens this on the housing, thus converting the trigger movement of the lever 10, by rotation of the gearwheels 42a to a lateral movement of the slide element 41 and therefore of the guide rail 4 and of the second holder section 2a. Since the toothed rod 101 is slightly curved, the lever 10 carries out a circular movement about the cylindrical pin 100. The rotation of the lever 10 is therefore converted to a lateral movement.

In addition to this embodiment described here, it is also possible to provide a guide just by means of the guide rail 4 and by means of the holding device 43. In addition, other drive units are also feasible. For example, the drive unit can be designed with a slide lever, in order to move the second holder section of the thermal stripper. For example, when the slide lever is moved parallel to the movement direction of the second holder section, the coating can likewise be stripped off the glass fiber. A further embodiment comprises the provision of an electric motor, which produces a lateral movement of the second holder section via a suitable transmission. The electric motor can therefore be used to achieve a defined tensile force for the stripping procedure.

The movement direction and speed required for the stripping process are controlled better by the stripping apparatus according to the invention. At the same time, the apparatus according to the invention can be operated by one hand. This is achieved by controlled transformation of a lever movement to a lateral movement of the second holder section. It is particularly advantageous if the stripping apparatus can be held in one hand and can be operated by a lever pressure. In addition to the embodiment in the form of a pistol as shown here, further implementations are feasible. For example, a lateral lever movement in the form of a sliding process can be converted directly to the lateral movement for the stripping process. The control of the stripping process can be improved further with the aid of an electric motor which produces a defined force for a lateral movement. In particular, the current which is required for the heating process can also advantageously be used to operate the electric motor.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A thermal stripping apparatus, comprising:
   a first holder section and a second holder section, which are designed to accommodate and hold at least one coated glass fiber, wherein the first holder section is arranged such that it can move with respect to the second holder section along a glass fiber to be accommodated, in order to cut off a coating on the glass fiber;
   a housing having a handle section for convenient gripping and having an appliance section in which the thermal stripper is arranged;
   a drive unit, which has a lever and an eccentric wheel and is operatively connected to the first holder section of the thermal stripper such that a rotary movement of the lever with respect to the handle section is converted to a lateral movement of the first holder section, wherein the eccentric wheel is connected to a gearwheel on the same cylindrical pin, and the gearwheel is coupled to the lever via a curved toothed rod.

2. The stripping apparatus of claim 1, wherein the handle section of the housing comprises an energy store for supplying the thermal stripper with electrical power.

3. The stripping apparatus of claim 2, wherein the energy store is designed to be removable and/or rechargeable.

4. The stripping apparatus of claim 1, wherein the handle section is designed for one-handed gripping, and the lever can be moved by one hand.

5. The stripping apparatus of claim 1, wherein the housing is in the form of a pistol and the appliance section is accommodated in a section in the form of a barrel.

6. The stripping apparatus of claim 1, further comprising:
   a control unit which has adjusting elements for adjusting the heating of the thermal stripper, wherein the control unit is at least partially arranged in the appliance section of the housing.

7. The stripping apparatus of claim 6, wherein the adjusting elements comprise at least one potentiometer which can be varied by a user.

8. The stripping apparatus of claim 1, wherein the drive unit comprises a guide rod which can be moved laterally and is coupled to the first holder section.

9. The stripping apparatus of claim 1, wherein the first holder section has a locking element for fixing the glass fiber cable.

10. The stripping apparatus of claim 1, further including a separating insert with a stripping blade, wherein the separating insert is arranged on the second holder section, facing the first holder section.

11. The stripping apparatus of claim 1, wherein the housing has at least one cover for covering at least one holder section of the stripper.

12. The stripping apparatus of claim 1, wherein the drive unit comprises an electric motor which can be adjusted via the lever and is coupled to the first holder section in order to produce the lateral movement.

* * * * *